Nov. 10, 1925.
C. M. ALEXANDER
1,561,044
BAFFLE TOWER
Filed Feb. 20, 1925 — 2 Sheets-Sheet 1
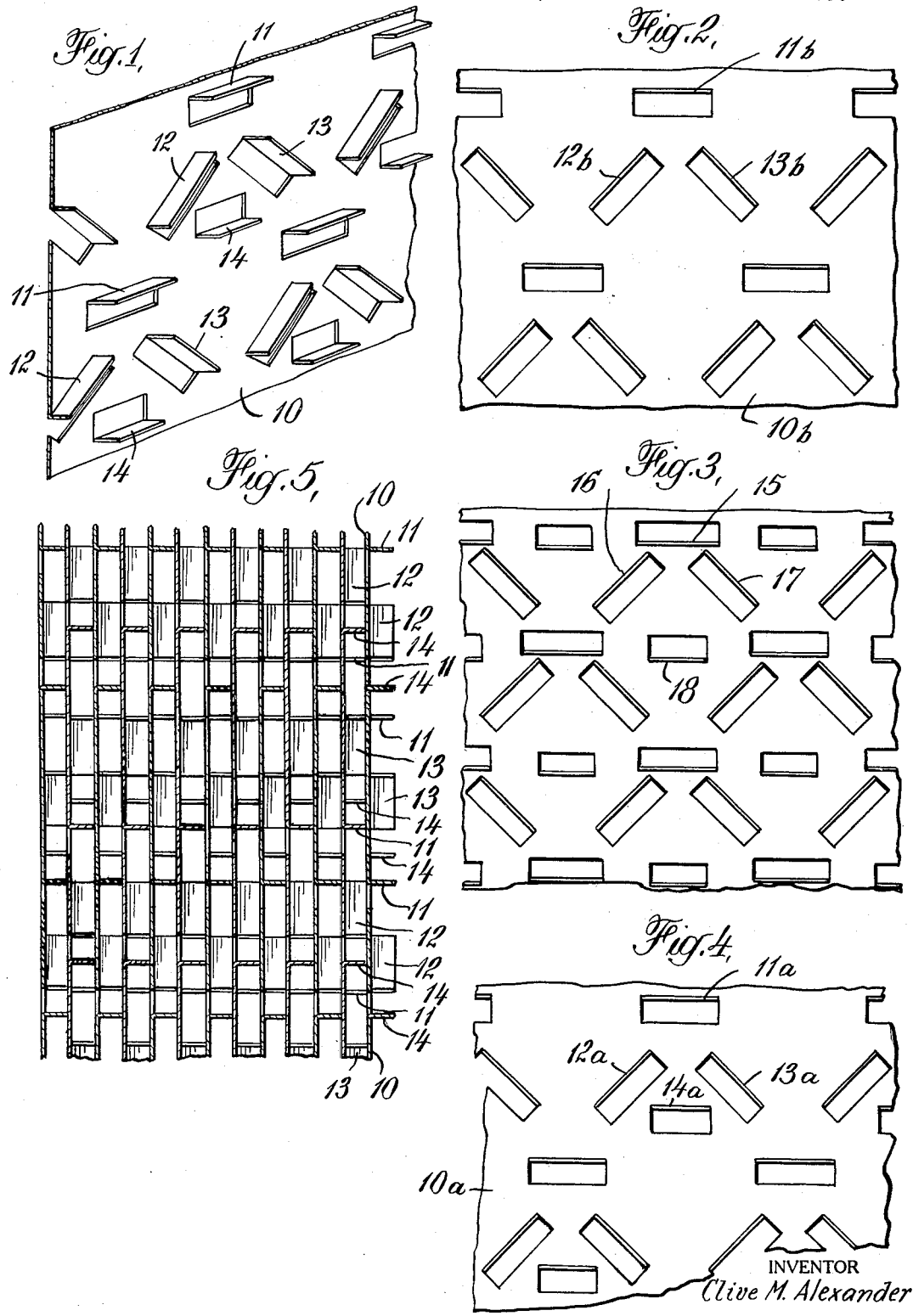
INVENTOR
Clive M. Alexander
BY
ATTORNEYS Nov. 10, 1925.  
C. M. ALEXANDER  
1,561,044  
BAFFLE TOWER  
Filed Feb. 20, 1925   2 Sheets-Sheet 2
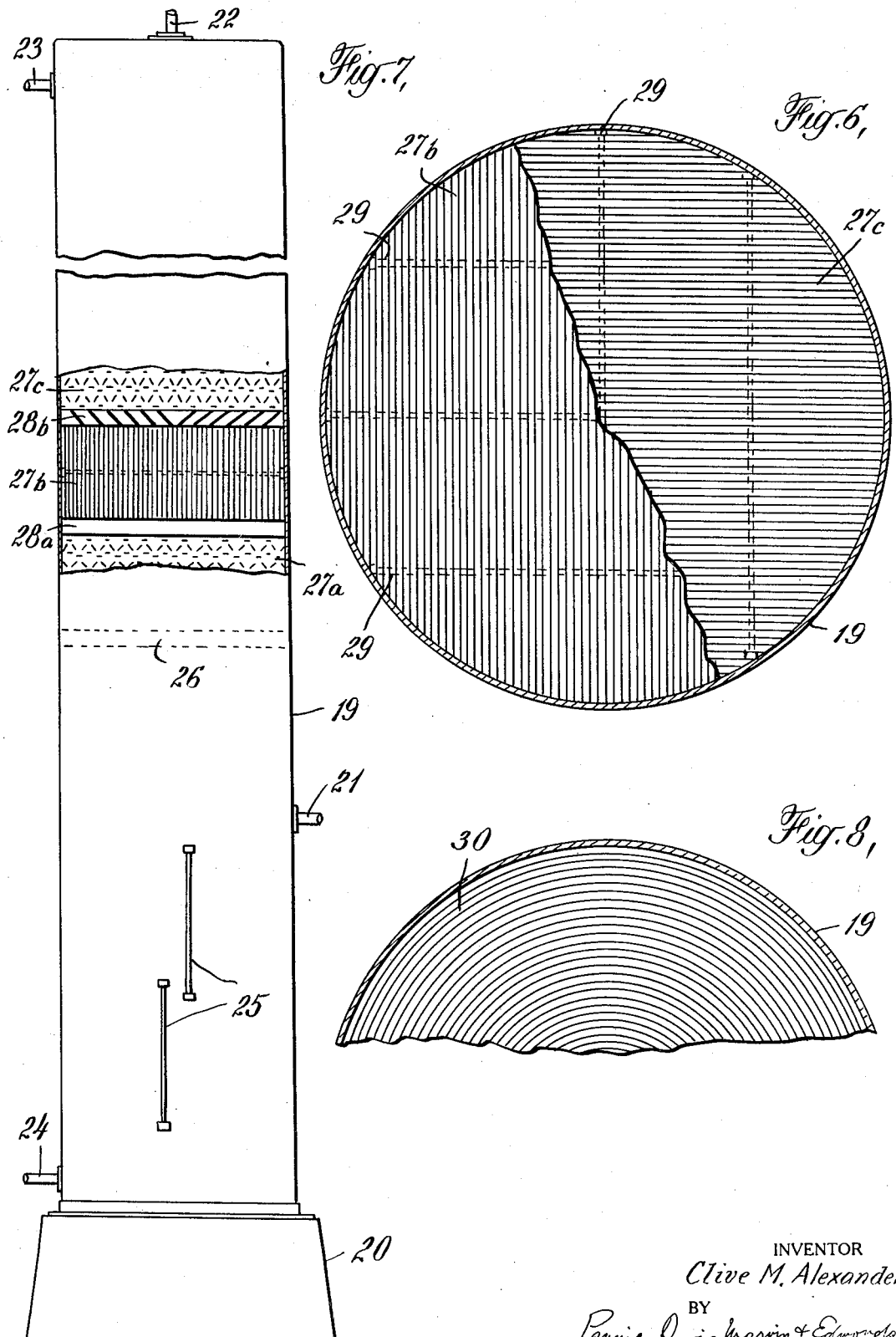
INVENTOR  
Clive M. Alexander  
BY  
Pennie, Davis, Marvin & Edmonds  
ATTORNEYS Patented Nov. 10, 1925.

1,561,044

UNITED STATES PATENT OFFICE.

CLIVE M. ALEXANDER, OF TULSA, OKLAHOMA.

BAFFLE TOWER.

Application filed February 20, 1925. Serial No. 10,523.

*To all whom it may concern:*

Be it known that I, CLIVE M. ALEXANDER, a citizen of the United States, residing at Tulsa, in the county of Tulsa, State of Oklahoma, have invented certain new and useful Improvements in Baffle Towers; and I do hereby declare the following to be a full, clear, and exact description of the invention, such as will enable others skilled in the art to which it appertains to make and use the same.

This invention relates to improvements in baffles and baffle elements for use in gas and liquid contact apparatus such as fractionation or absorption towers. The baffle and baffle elements of the invention are particularly adapted for effecting contact, and heat transfer, between gases and liquids, and have several important advantages and characteristics. The invention includes the improved baffles and the improved baffle elements. In one aspect, the present invention is a further improvement upon the baffles and baffle elements described in my application filed November 5, 1923, Serial No. 672,725.

The improved baffle of the present invention comprises a series of spaced substantially parallel sheets or plates with gas and liquid deflecting projections arranged in the spaces between successive sheets or plates. In use, the sheets or plates of the baffle are vertically arranged with the edges of the sheets or plates exposed on the upper and lower faces of the baffle, and in the following description the baffle and the parts of the baffle will be referred to as in that position. The baffle elements of the invention comprise the sheets or plates of which the assembled baffle is made up.

In the improved baffle of the present invention, the deflecting projections are of trapezoidal configuration and are arranged with the shorter parallel faces of the projections toward the upper face of the baffle. These projections are formed of flanges integral with the sheets or plates and formed therefrom, for example, the flanges may consist of elements of the sheet or plate cut partly free therefrom and bent from the plane of the sheet or plate. The deflecting flanges need not completely form trapezoidal figures, and, in particular, the lower or longer parallel faces may be entirely omitted. The shorter or upper faces of the projections may also be spaced from the inclined faces, but where they are so spaced the upper ends of the inclined flanges are advantageously spaced apart from each other a distance not greater than the length of the upper flange so that the lateral flanges extend to a point vertically beneath the ends of the upper flanges.

The upper and lateral flanges forming the deflecting projections act to film and distribute liquid flowing downwardly over the baffle and to bring gas flowing upwardly over the baffle in intimate and uniform contact therewith. By forming the baffle of metal or other material of good heat conducting properties, heat transfer is also promoted through the baffle elements as well as by the direct contact of the gases and liquids. The flanges are advantageously arranged so that they present, with the sheet or plate of the baffle element, closed upper and lateral faces toward the upper face of the baffle, or toward approaching liquid, insuring positive and thorough distribution of the liquid flowing over the baffle.

It will be apparent from the foregoing that the flanges forming the upper faces of the trapezoidal deflecting projections are arranged substantially normal to the general direction of liquid flow. The deflecting projections may also be arranged on the baffle elements in rows generally normal to the general direction of liquid flow, and successive rows may advantageously be staggered so that downflowing liquid from between projections in preceding rows is directed onto the normal upper flanges of the projections in the succeeding rows. Additional gas deflecting or distributing flanges may also be arranged on the sheets or plates beneath each of the previously described projections.

The sheets or plates with the integral flange projections, as described, are the improved baffle elements of the present invention, and the assembled baffle of the invention is made up of these elements supported together in any suitable manner. For example, a series of the elements may be clamped together by bolts passing therethrough. The successive baffle elements may with advantage be spaced by the projecting flanges thereon. The baffle may be made up of flat elements, or of a series of elements in the form of concentric rings, or of one or more elements in spiral form. The shape and arrangement of the baffle elements can be readily adjusted so that the assembled baffle will conform to the shape of the container in which it is to be placed.

The assembled baffle is self-supporting and a series of such baffles can be superposed to any height necessary to attain the desired degree and extent of contact or of heat transfer between the gases and liquids. Successive baffles may be placed directly on the preceding baffles, or the baffles may be separated by suitable gratings or may be separately supported in the container. Any tendency toward liquid concentration near the outer ends of the elements in successive baffles may be counteracted by providing deflectors adapted to direct the flow toward the center of the baffles between adjacent baffles or at appropriate intervals. With baffles composed of circular or spiral elements such deflectors are usually unnecessary although they are employed with advantage in connection with baffles formed of flat elements. Where flat elements are employed, the elements in successive baffles are advantageously angularly disposed with respect to the elements in the preceding baffle.

The invention will be further described in connection with the accompanying drawings which illustrate various embodiments of the invention, but it will be understood that this further description and illustration are by way of exemplification and not limitation. In the accompanying drawings:

Fig. 1 represents in perspective a fragment of a baffle element embodying the invention, Fig. 2 represents a fragmentary plan view of a modified form of baffle element embodying the invention, Figs. 3 and 4 are views similar to Fig. 2 showing other modified baffle elements, Fig. 5 is a fragmentary section, transverse to the sheets or plates of the baffle elements, of an assembled baffle embodying the invention, Fig. 6 is a plan view of two baffles with flat elements embodying the invention superposed in a container with part of the upper baffle broken away, Fig. 7 represents, on a reduced scale, in elevation and partly in section, a tower or container having baffles embodying the invention, such as shown in Fig. 6, arranged therein, and Fig. 8 is a fragmentary view similar to Fig. 6 showing a baffle made up of circular elements.

Referring to Fig. 1 the baffle element is made up of a sheet or plate 10 with a series of flanges projecting therefrom. The projecting flanges are formed of elements cut partly free from the sheet or plate and bent from the plane thereof to provide deflecting faces on the baffle element. The flanges are arranged to form projections of trapezoidal configuration, the projections comprising an upper flange 11 substantially normal to the general direction of liquid flow and a pair of inclined flanges 12 and 13 arranged beneath the flange 11. The upper ends of the inclined flanges 12 and 13 are spaced apart a distance somewhat less than the length of the flange 11 so that liquid flowing vertically downwardly from the ends of the flange 11 falls on the inclined faces of the flanges 12 and 13. A plurality of projections formed of groups of flanges such as 11, 12 and 13 are arranged on the surface of the baffle element in rows generally normal to the general direction of liquid flow, that is substantially parallel to the upper edge of the baffle element, and the upper flanges of successive projections are arranged between the spaces between the lower ends of the inclined flanges in adjacent pairs. Liquid flowing downwardly over the baffle element, and parallel to the sheet or plate 10, is filmed out by the flanges 11 from whence it is distributed onto the inclined flanges 12 and 13 therebelow and is successively distributed in streams which are divided and sub-divided as it flows downwardly over the baffle. Additional gas deflecting or distributing flanges may also be arranged beneath the groups of flanges forming the upper and lateral faces of the deflecting projections. In the baffle element illustrated in Fig. 1 gas deflecting flanges 14 are provided presenting with the sheet or plate of the baffle element a closed face towards the approaching gas. These gas deflecting flanges may also be flanged in the opposite direction as shown in Fig. 4 where corresponding parts are designated by the same reference character with the letter "a" appended. In the baffle element illustrated in Fig. 2 these supplementary gas deflecting flanges are omitted, and the deflecting projections are made up of flanges $11^b$, $12^b$ and $13^b$ on the sheet or plate $10^b$. In the baffle elements illustrated in Figs. 1, 2 and 4 the flanges forming the deflecting projections are arranged so that they present with the sheet or plate of the baffle element closed upper and lateral faces toward approaching liquid preventing flow of liquid through the baffle elements and confining the liquid flow to paths generally parallel to the sheet or plate of the baffle elements. The projecting flanges, however, may also be arranged as illustrated in Fig. 3, flanges 15 substantially normal to the general direction of liquid flow being flanged downwardly over the upper ends of inclined flanges 16 and 17. Additional gas deflecting flanges 18 may also be provided in this form of baffle element. Fig. 5 represents a fragment of an assembled baffle made up of elements of the type illustrated in Fig. 1. The successive baffle elements are spaced by the projecting flanges themselves so that the distribution of liquid flowing downwardly over the baffle is positive and is confined to the paths over and between the upper and lateral flanges 11, 12 and 13 of the several projections.

The tower diagrammatically illustrated in Fig. 7 is suitable for an absorption tower or scrubbing tower or fractional condenser or reflux tower. The vertically arranged drum 19, supported upon base 20, is provided with a gas inlet 21, a gas outlet 22, a liquid inlet 23, and a liquid draw-off 24. Gauge glasses 25 are provided to indicate the level of the liquid collecting in the lower part of the drum 19. A grating 26 is supported in the drum above the gas inlet 21. This grating in turn supports a series of baffles 27ª, 27ᵇ, 27ᶜ, etc. Where baffles with transverse elements are employed, as illustrated, they may be spaced by a series of slats 28ª, 28ᵇ, etc. disposed to direct liquid flow toward the center of successive baffles. The baffle elements in successive baffles are advantageously arranged substantially normal to the elements in the preceding baffle, as more clearly illustrated in Fig. 6. The bolts 29 clamping together the elements in each of the baffles are also shown in Fig. 6. In place of the baffles made up of flat elements as shown in Figs. 6 and 7, baffles made up of circular elements 30 may be employed in accordance with the invention as illustrated in Fig. 8.

The improved baffles and baffle elements of the present invention have several important advantages. In a tower, such as an absorption or fractionating tower, provided with the improved baffles, gas and liquid passing therethrough are contacted thoroughly and uniformly, a condition essential to the efficient operation of such apparatus. Any lack of uniformity of initial distribution of either gas or liquid is quickly overcome and the improved baffles substantially prevent the development of subsequent non-uniform distribution throughout the tower. A single baffle of the type provided by this invention will effect good distribution of liquid passing thereover even though discharged thereon undistributed and such a single baffle may be placed at the top of a contacting tower containing other distributing elements to provide good initial distribution, or such baffles may be placed at intervals throughout such a tower to maintain good distribution and overcome any disturbances arising. The uniformity of distribution attained promotes thorough and effective contacting. The improved baffle also provides a large area of contact between the gas and liquid passing thereover and a high ratio between the surface and the volume of the liquid passing over the baffle. Heat interchange is also facilitated by the large area of contact. The baffle is compact, however, and gives a large area of contact between gas and liquid particularly with reference to the volume occupied by the baffle. The baffle also offers little resistance to the flow of both gas and liquid, and this feature, in conjunction with the large area of contact provided as compared to the volume of the baffle, tends to reduce the space required by apparatus to handle a given volume of gas and liquid. The high efficiency of the contacting effected also permits the passage of gas and liquid over the baffle at increased velocity without sacrifice in efficiency enabling a further increase in capacity. The baffle elements drain quickly and completely, and the sharp lower edges of the inclined flanges inhibit any tendency for entrainment of liquid in the gas stream in normal operation. In gas and liquid contact apparatus, the improved baffle of the present invention has the further advantage that it substantially eliminates difficulties due to "channelling," that is the passage of gas or liquid through the apparatus in streams of relatively large cross section without thorough distribution and contact. The improved baffle and baffle elements of the invention are moreover simple, inexpensive and easily fabricated.

I claim:

1. An improved baffle for promoting gas and liquid contact, comprising a series of sheets or plates supported in spaced substantially parallel relation with a plurality of projections trapezoidal in configuration arranged in the spaces between the sheets or plates with the shorter parallel trapezoidal faces of the projections disposed toward one face of the baffle, said projections being formed of flanges integral with the sheets or plates.

2. An improved baffle for promoting gas and liquid contact, comprising a series of sheets or plates supported in spaced substantially parallel relation with a plurality of projections trapezoidal in configuration arranged in the spaces between the sheets or plates with the shorter parallel trapezoidal faces of the projections disposed toward one face of the baffle, said projections being formed of flanges integral with the sheets or plates, the successive sheets or plates of the baffle being spaced by the projections thereon.

3. An improved baffle for promoting gas and liquid contact, comprising a series of sheets or plates supported in spaced substantially parallel relation with a plurality of projections trapezoidal in configuration arranged in the spaces between the sheets or plates with the shorter parallel trapezoidal faces of the projections disposed toward one face of the baffle, the projections being arranged in rows generally normal to the same face of the baffle, successive rows on each sheet or plate being staggered, said projections being formed of flanges integral with the sheets or plates.

4. An improved baffle for promoting gas and liquid contact, comprising a series of sheets or plates supported in spaced substantially parallel relation with a plurality of projections trapezoidal in configuration arranged in the spaces between the sheets or plates with the shorter parallel trapezoidal faces of the projections disposed toward one face of the baffle, said projections being formed of flanges integral with the sheets or plates, the flanges forming the said shorter faces of the projections and the adjacent inclined flanges presenting with the sheets or plates closed faces toward the same face of the baffle above mentioned.

5. An improved baffle for promoting gas and liquid contact, comprising a series of sheets or plates supported in spaced substantially parallel relation with a plurality of projections trapezoidal in configuration arranged in the spaces between the sheets or plates with the shorter parallel trapezoidal faces of the projections disposed toward one face of the baffle, said projections being formed of flanges integral with the sheets or plates, and supplementary deflecting flanges arranged behind said projections from the said baffle face.

6. An improved baffle element for promoting gas and liquid contact, comprising a sheet or plate having a plurality of projections trapezoidal in configuration arranged thereon, the shorter parallel trapezoidal faces of the projections being disposed toward one edge of the sheet or plate, said projections being formed of flanges integral with the sheet or plate.

7. An improved baffle element for promoting gas and liquid contact, comprising a sheet or plate having a plurality of projections trapezoidal in configuration arranged thereon, the shorter parallel trapezoidal faces of the projections being disposed toward one edge of the sheet or plate, said projections being formed of flanges integral with the sheet or plate and arranged in staggered rows generally normal to the same edge of the sheet or plate.

8. An improved baffle element for promoting gas and liquid contact, comprising a sheet or plate having a plurality of projections trapezoidal in configuration arranged thereon, the shorter parallel trapezoidal faces of the projections being disposed toward one edge of the sheet or plate, said projections being formed of flanges integral with the sheet or plate, the flanges forming the said shorter faces and the adjacent inclined flanges presenting with the sheet or plate closed faces toward the same edge of the sheet or plate.

9. An improved baffle element for promoting gas and liquid contact, comprising a sheet or plate having a plurality of projections trapezoidal in configuration arranged thereon, the shorter parallel trapezoidal faces of the projections being disposed toward one edge of the sheet or plate, said projections being formed of flanges integral with the sheet or plate, and supplementary deflecting flanges arranged behind said projections from the same edge of the sheet or plate.

In testimony whereof I affix my signature.

CLIVE M. ALEXANDER.